April 20, 1954     M. A. LEAVITT ET AL     2,676,299

PHASE METER

Filed Nov. 14, 1951

INVENTORS.
MINARD A. LEAVITT
BY    BOB HUGH SMITH

Roland A. Anderson
ATTORNEY.

Patented Apr. 20, 1954

2,676,299

UNITED STATES PATENT OFFICE 2,676,299

PHASE METER

Minard A. Leavitt, Concord, and Bob Hugh Smith, Berkeley, Calif., assignors to the United States of America as represented by the United States Atomic Energy Commission Application November 14, 1951, Serial No. 256,238

7 Claims. (Cl. 324—83)

The present invention relates to an improved phase meter for measuring phase difference between electrical signals and more particularly concerns apparatus capable of very accurately indicating the deviation of a phase angle from a predetermined desired value.

The measurement of phase angles has long been accomplished by the "three meter" method in which total voltages are measured and the measurements compared as an indication of phase difference; however, the accuracy of this conventional method is not great and in applications requiring exact phase differences it is unsatisfactory. The present invention provides a high degree of accuracy in the measurement of phase angle deviation from a standard or predetermined value and thereby overcomes a problem of some importance.

It is an object of the present invention to provide a new and improved method and apparatus for measuring phase angles between electrical signals.

It is another object of the present invention to provide a new and improved apparatus for measuring deviations of phase angles from a predetermined value.

It is a further object of the present invention to provide an improved phase meter in which the measurement of difference voltages provides an indication of phase angle deviations between voltages.

Many other objects and advantages of the present invention will be apparent to those skilled in the art from the following description taken together with the accompanying drawings wherein.

Figure 1:
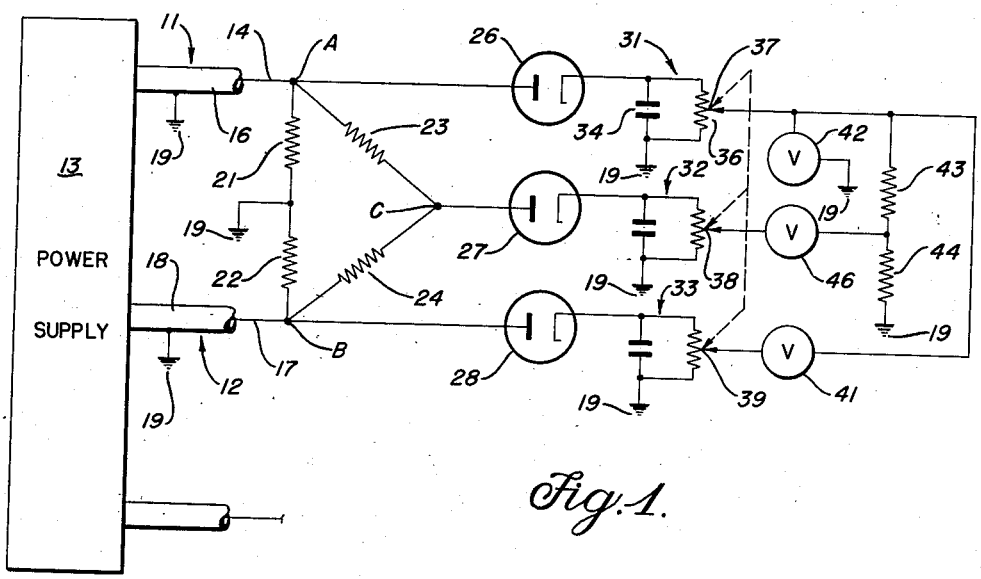
Figure 1 is a schematic wiring diagram of a preferred embodiment of the invention.

Considering now the details of a preferred embodiment of the invention, it is noted that solely for the purposes of illustration the following disclosure is referenced to the measurement of phase angle deviation from 120°, although deviations from other angles may also be measured by appropriate modification as noted below. There is shown in Fig. 1 a pair of conductors 11 and 12 extending from a voltage source 13 which provides a voltage in conductor 11 which is substantially 120° out of phase with the voltage in conductor 12. For example, source 13 may consist of a three phase power supply and conductors 11 and 12 may be connected to two phases thereof although, of course, the voltages in conductors 11 and 12 may have a phase difference brought about by other means. Conductors 11 and 12 are shown as coaxial conductors with conductor 11 having a center wire 14 and sheath 16 and conductor 12 having a center wire 17 and sheath 18. The sheaths 16 and 18 of conductors 11 and 12 are connected to the same constant potential point, as for example ground 19. The center wires 14 and 17 of conductors 11 and 12 are connected to terminals A and B respectively and these points are connected to the same constant potential point 19 as sheaths 16 and 18, through identical resistors 21 and 22. Also, terminals A and B are connected together through a series combination of two identical resistors 23 and 24; the junction point of these resistors being denoted as terminal C for convenience.

For the purpose of rectification, there are provided three unidirectional electronic valves, such as diode vacuum tubes 26, 27, and 28, which have their anodes connected to terminals A, C, and B, respectively. The cathodes of tubes 26, 27, and 28 are each connected through individual capacitor-potentiometer circuits 31, 32, and 33, respectively, to a constant potential point, such as ground 19. Capacitor-potentiometer circuits 31, 32, and 33 are all alike and circuit 31, for example, consists of a capacitor 34 connected in parallel with a potentiometer 36 and the parallel combination is connected between the cathode of diode tube 26 and ground. The variable contacts 37, 38, and 39 of the potentiometers in circuits 31, 32, and 33, respectively, are ganged together as shown by the dotted lines in Fig. 1 so that the cathode-to-ground resistance of all of the diode tubes is changed together by movement of the ganged control.

Connection is made from potentiometer contact 37 through a voltmeter 41 to potentiometer contact 39 and also from contact 37 to ground 19 through another voltmeter 42. In addition, potentiometer contact 37 is grounded through a voltage divider consisting of a resistance having a center tap or a pair of equal resistances 43 and 44 connected in series and connection is made from potentiometer contact 38 through a voltmeter 46 to the center of resistance of the voltage divider.

Figure 2:
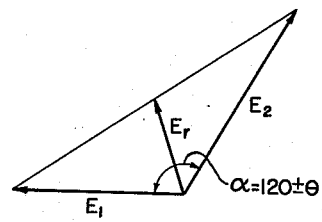
Fig. 2 is a vector diagram showing two voltage signals having an included phase angle to be measured.

Considering now the theory of operation of the invention, reference is made to Fig. 2 showing a vector diagram of the voltages in the abovedescribed circuit. In Fig. 2 vectors $E_1$ and $E_2$ represent the voltages between ground and conductors 14 and 17, respectively. Voltages $E_1$ and $E_2$ are separated by the phase angle $\alpha$ which is desired to be 120° and which is designated as 120°$\pm\theta$, with $\theta$ being the angular deviation from normal. Voltage vector $E_r$ is the voltage between ground and the midpoint between the voltages in conductors 14 and 17. It will be appreciated that when $E_1=E_2$ and the phase angle $\alpha=120°$, $$E_r = \frac{E_1}{2}$$

inasmuch as $$E_r = E_1 \cos \frac{\alpha}{2}$$

Corrections may be made for variations of $E_1-E_2$ from zero and $$E_r - \frac{E_1}{2}$$

from zero, which then gives $\theta$, the angular deviation of the phase angle $\alpha$ from 120°. A derivation of the relationship of these values to the phase angle may be made from the vector diagram, and letting $\Delta E = E_1 - E_2$ and $\delta E = E_r - \frac{1}{2}E_1$ it may be expressed as:

$$\delta E = \tfrac{1}{2}\sqrt{(E_1-\Delta E)^2 - 2E_1(E_1-\Delta E)\cos(60-\theta)+E_1^2} - \frac{E_1}{2}$$

or in percent of $E_1$ this reduces to $$\delta E = \sqrt{\left(1-\frac{\Delta E}{E_1}\right)\left(\frac{1-\cos(60-\theta)}{2}\right)+\tfrac{1}{4}\left(\frac{\Delta E}{E_1}\right)^2} - \tfrac{1}{2}$$

Figure 3:
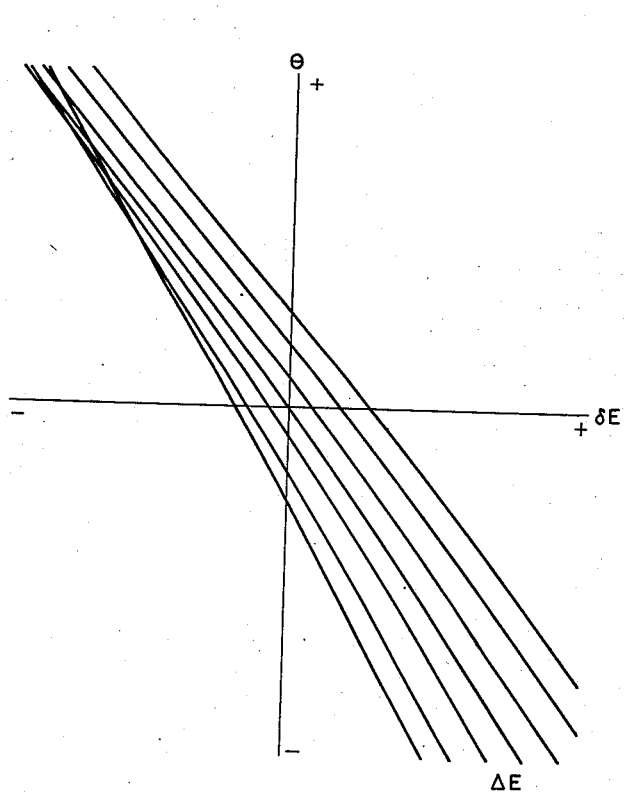
Fig. 3 is a graph for the conversion of the voltmeter readings of the invention to phase angles.

This relationship may be best employed by graphing the expression as shown in Fig. 3 for various values of $\Delta E$ and $\delta E$ to obtain the corresponding values of $\theta$ which may then be added to 120° to obtain the phase angle $\alpha$.

The invention is operated to obtain the desired voltage measurements by connecting terminals A and B to conductors 14 and 17 of cables 11 and 12, respectively. These cables have voltages applied thereto from power supply 13 which are out of phase with each other and which may be two phases of a three phase system, in which case the phase angle would be 120°. Connected between points A and B is a voltage divider comprising resistors 23 and 24 which have equal resistances and which are joined together at terminal C. The voltages at A, B, and C are rectified by diode rectifiers 26, 27, and 28 connected to these points and these rectified voltages are grounded through resistance-capacitance networks 31, 32, and 33, respecitvely. High frequency signals are by-passed to ground through the capacitance portion of the above-noted networks and movable taps 37, 38, and 39 on the potentiometer portions of these networks pick off a desired proportion of these voltages to be measured. The potentiometer contacts are ganged together so that the same proportion of the rectified voltages at A, B, and C are measured. In proportions, voltmeter 42, between contact 37 and ground, measures the voltage of point A, voltmeter 41, between contacts 37 and 39, measures the absolute value of the voltage between points A and B, and voltmeter 46, between contact 38 and the juncture of resistors 43 and 44 serially connected between contact 37 and ground, measures the difference between the voltage of point C and one-half the voltage of point A.

It will thus be seen that in terms of the vector diagram of Fig. 2, voltmeter 42 indicates $E_1$, voltmeter 41 indicates $E_1-E_2$, and voltmeter 46 indicates $E_r-\tfrac{1}{2}E_1$. Greatest simplicity and utility is achieved by employing a percentage relationship with $E_1$ as the base as is done in the above equation, and this equation may be even further simplified by adjusting the potentiometers to make $E_1=1$, in which case the equation may be written:

$$\delta E = \sqrt{(1-\Delta E)\left(\frac{1-\cos(60-\theta)}{2}\right)+\frac{(\Delta E)^2}{4}} - \tfrac{1}{2}$$

in which $\delta E$ and $\Delta E$ are read from voltmeters 42 and 46, respectively.

It will, of course, be appreciated that individual angles may be computed directly from the readings of voltmeters 41, 42, and 46 without the use of a graph; however, results are more rapidly obtained in most instances by the use of a graph such as shown in Fig. 3.

The preesnt invention provides an improved phase meter which has, in addition to the above-noted advantages, the further advantage of being capable of operating upon voltages of any frequency. Inasmuch as the voltages are rectified before measurement, the only frequency limitation lies in the rectifiers and in this respect there may be employed any of numerous types of rectifying devices, some of which are substantially unlimited by frequency. Thus one of the major limitations of former phase meters, namely, limited frequency range, has been overcome by the present invention.

Although the present invention has been disclosed with respect to but a single preferred embodiment, it will be apparent to those skilled in the art that various modifications and variations are possible within the spirit and scope of the invention and thus it is not intended to limit the invention except by the terms of the following claims.

What is claimed is:

1. An improved phase meter for measuring the variation of phase angle from 120° and comprising in combination with a pair of conductors having voltages impressed thereon of a relative phase to be determined, a pair of resistors having equal resistances connected in series between said conductors and being grounded at the common juncture thereof, a voltage divider connected between said conductors and comprising a pair of equal series-connected resistances and a center terminal at the common juncture of said resistances, a grounding resistor having a center tap and connected between one of said conductors and ground, first voltage measuring means connected between said conductors, and second voltage measuring means connected between the center terminal of said voltage divider and the center tap of said grounding resistor whereby said voltages measured are indicative of the variation of the phase angle from 120°.

2. An improved phase meter comprising a pair of input terminals for connection to separate voltages having a phase difference to be measured, a voltage divider connected between said terminals and having a third terminal thereon, rectifier means connected to said pair of input terminals and to said third terminal for rectifying the voltage thereat, and voltage measuring means connected to said rectifier means and indicating the rectified voltage between input terminals, the voltage at one input terminal, and the voltage differences beween the voltage of said third terminal and a predetermined proportion of the voltage of one of said input terminals as a measure of the phase angle between the voltages at said input terminals.

3. An improved phase meter comprising first and second input terminals adapted to have first and second voltages applied thereto respectively, said voltages having an undetermined deviation from a predetermined phase angle therebetween, a voltage divider connected between said input terminals and having a third terminal at the center of resistance thereof, rectifier means connected to said three terminals and rectifying the voltages thereat, and voltage measuring means connected to said rectifier means measuring the absolute voltage between said first and second terminals, the voltage of said first terminal, and the voltage difference between the third terminal and a predetermined proportion of the voltage at said first terminal as an indicator of the deviation of the voltage phase angle from the predetermined phase angle.

4. An improved phase meter comprising input terminals adapted to be connected to conductors having voltages impressed thereon, the voltages having a phase angle of substantially 120° therebetween, a voltage divider connected between said input terminals and including a pair of series-connected resistors of equal resistance being joined at a center terminal, rectifier means connected to said center and input terminals producing direct current voltages from the voltages at these terminals, and voltage measuring means connected to said rectifier means and measuring the rectified voltage between said input terminals, the voltage of one of said terminals, and the voltage difference between said center terminal and one-half the voltage of one of said input terminals.

5. An improved phase meter comprising a pair of input terminals adapted to have impressed thereon two voltages having a relative phase angle of the order of 120 degrees, a center terminal, a pair of resistors of equal resistance connected on each side of said center terminal and one to each input terminal whereby said center terminal is maintained at an equal voltage from each of said input terminals, a first voltage measuring device connected between one of said input terminals and electrical ground indicating the voltage of one of said input terminals, a voltage divider connected across said first voltage measuring means and having a center tap, second voltage measuring means connected between said center terminal and the midtap of said voltage divider and indicating the voltage difference between the voltage of said center terminal and one-half the voltage of one of said input terminals, and third voltage measuring means connected between said input terminals measuring the absolute voltage difference therebetween, variations in the phase angle from 120 degrees being a function of these voltmeter readings.

6. An improved phase meter comprising, a pair of input terminals adapted to have impressed thereon a pair of voltages whose relative phase angle deviation $\theta$ from 120° is to be measured, first voltage measuring means connected between said input terminals for indicating the absolute value $\Delta E$ of the voltage therebetween, second voltage measuring means connected to one of said input terminals and indicating the voltage $E_1$ thereof, and third voltage measuring means measuring the voltage difference $\delta E$ between one-half the voltage of one of said terminals and the voltage midway between the voltage of said terminals whereby the phase angle deviation $\theta$ is determinable from the relation:

$$\delta E = \tfrac{1}{2}(E_1 - \Delta E)^2 - 2E_1(E_1 - \Delta E)\cos(60-\theta) + E_1^2 - \frac{E_1}{2}$$

7. An improved phase meter for measuring the angular deviation of a phase angle between two voltages from 120 degrees, and comprising, first and second input terminals adapted to have first and second out-of-phase voltages respectively impressed thereon, a pair of resistors of equal resistance connected in series between said input terminals and being grounded at the juncture thereof, a first voltage divider connected between said input terminals with a center terminal at the midtap thereof, rectifier means including first, second and third unidirectional electronic valves connected to said first, second and center terminals respectively to rectify the voltages thereof, first voltage measuring means connected between said first valve and ground, second voltage measuring means connected between said first and second valves, a second voltage divider having a midtap and connected between said first valve and ground, and third voltage measuring means connected between said third valve and the midtap of said second voltage divider whereby voltages indicated by said second and third voltage measuring means are a measure of the phase angle deviation from 120 degrees.

References Cited in the file of this patent

UNITED STATES PATENTS

| Number | Name | Date |
|---|---|---|
| 756,846 | Grammont | Apr. 12, 1904 |
| 1,968,068 | Blancard et al. | July 31, 1934 |
| 2,318,248 | Minton | May 4, 1943 |

FOREIGN PATENTS

| Number | Country | Date |
|---|---|---|
| 617,614 | Great Britain | Feb. 9, 1949 |
| 720,750 | Germany | May 14, 1942 |